(12) United States Patent
Miller

(10) Patent No.: X8215
(45) Date of Patent: May 23, 1834

(54) BEDSTEADS

(76) Inventor: Robert Miller

Robert Miller of Glascow, State of Kentucky,

Letters Patent,

The schedule referred to in these Letters Patent and making
part of the same, containing a description in the words of the said
Robert Miller himself of his improvement in Bed Steads.
To all to whom these presents shall come,
Be it known that I Robert Miller of Glascow in the County
of Barren and State of Kentucky have invented a new and
useful improvement in bed steads and that the following is a full
& exact description of the construction of a bed stead invented by me.
The frame of a bed stead is prepared in the usual manner
but without mortise or tenon, At the destined height of the bed
rails say two feet, a right angle frame (capable of containing the
other) is made one side and end of which are firmly fixed, the other
slide up by wedge or screws, under the rails are pieces to support
them at a proper height, & the projections of the posts are counter-
sunk in the frame, Into it the bedstead is put in proper position
and very firmly clamped up —
There are 8 pieces of cast iron & 4 of wrought which in the
aggregate are named Trestles the former consists of 4 right angled
knees, each leg being 6 inches long 4 broad & 5/8 or upwards in
thickness with two small ray wheels & their falls are catchy, the
faces of the legs are called friezes in each of which are at least three
3/4 holes that receive wood screws of 3 1/2 inches long, The corner
is a little obtuse after which it is 3/4 thick in it are two similar
holes receiving screws of 4 1/2 inches the first binds the frieze to
the rails & the last going into the posts diagonally unites the
three pieces of each corner into one solid body, whence the knees
are termed binders The four iron bars are about one inch
diameter square, round or eight cornered, they are placed inside and parallel to the bed rails, at one to one & a half inches therefrom
and pass thro' the frieze half an inch at each end, those of the sides
into the middle of the end frieze & they of the ends one inch [illegible]
in the side frieze they carry the bed and are named Sustainers
supporters or Beavers. a side and end beaver have square axles well
fitted to their holes in the frieze & remain fixed when in place, the
other two have round axles one end of which bearing a cog wheel, to
wind & tighten the canvass, its catch works on a screw nail that
passes thro' the frieze the axles behind these wheels have such
form as tends to draw in the bars when winding, which presses
the wheels against the frieze & hermetically seals the aper
tures at that end also, A piece of 3/4 square iron say 18 inches long is formed into
an open wrench at one end & screw driver at the other it is
the only instrument necessary to put up or Take down these bed
steads, a piece of wood put into the wrench gives the power of an
auger handle to him that drives the screws, & the wrench is
fitted to the ends of the supporters, with it a child may tighten
the canvas in a moment, it should lie on two pins inside of
the front rail, on one side of each beaver bar, 8 small
pyramidal Barbs. are raised with a cold Chisel to an angle
of 20 degrees they rise to one sixteenth of an inch, stand
transversely & pointing from the draft in winding the sacking
bottom they are permanent, catch the end of the linen in
stantly & retain their hold. (small pins may be drilled in, or
each beaver may be in two parts, which clamp the ends between
them but the first is the best of all modes. — A sacking
bottom is made in the form of a double cross. the arms exten
-ding 16 or 20 inches from the body (which is about 6 inches nar
-rower than the beaver) that they may roll three or four times
round the supporters before the linen begins to bear. & leave 3
inches at each side to wind up future stretching No joint in the bedstead can move hence the head & foot bearers are slipped into shallow grooves in the posts; cast iron or brass grooves might be screwed on but they destroy the uniformity & beauty of the piece. To put on a canvass bottom, spread the linen on the floor wrong side up with the arms extended hook the two fixed bearers their side and end arms, roll up to within three inches of the body, lift them together turn and put them in place; hook the other arms to their moveable bearers then in place & wind up with the wrench, to any desired tightness A bedstead is taken down by one person in two minutes thus lift out the head and foot boards let go the rag wheels & take out their bearers unscrew three nails in each end rail The contrary order is observed in setting them up,- Bedsteads subject to frequent removals or to journeys have their end rails built of two pieces they are overlapped two feet in the middle & united into one by by two screws; they are taken down with equal celerity & without disturbing the corners or leaving much weight upon their knees.

Second and best manner of placing the supporting bars lest careless workmen should leave room for the ingress or egress of a single reptile at the axles a mode of placing the bearers without perforating the bed rails is invented, which by leaving nothing to chance perfects the bedstead Rests are cast with the knees rising on their friezes (say half an inch thence a broad arm projects parallel to the frieze a quarter thick leaving the other quarter vacant between them in which the wheels move. These rests are formed in such manner that the sustainers are dropped into [illegible] at once and firmly maintain their position (they now extend between the friezes only) with the model are a complete & full sized set of patterns for the castings of a bedstead, several kinds of these rests are loosely attached to their friezes [illegible] [illegible] [illegible] which so simply will be satisfactory, [illegible] submitted [illegible] a large hide will dispose in the manner of parchment or

[illegible] & coloured [illegible] would not make the most [illegible], clean and durable bottom.

All the irons must be painted which renders them invulnerable to water and they rise full grown Phenix's from fire hence one [illegible] of each set should record the year of their birth that every house in future ages may possess what is now undetermined a true Cronological era, this frame is joined to its trestles and filled without mortise, tenon, pin, nut, cord, lace, line or eyelet hole, it is firm to solidity, durable as wood & iron nor is there a single invisible lodgment for one of those pestiferous vermin that have so long annoyed the human family It never needs scalding whence it is called the Clean firm and everlasting Bedstead Witnesses Thom.s S. Hellen — Robert Miller B. V. [illegible] — 1417 [illegible]

United States Patent
Patent No.: X8215
*R. Miller.*
*Henry Brake.*
*Patented May 23, 1834.*
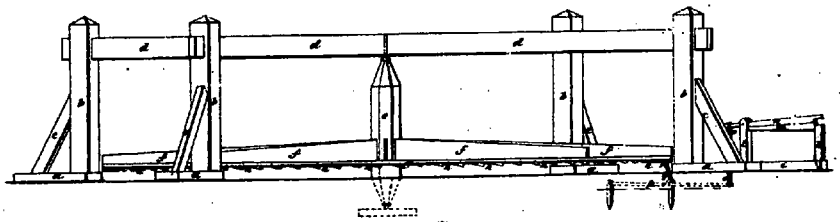
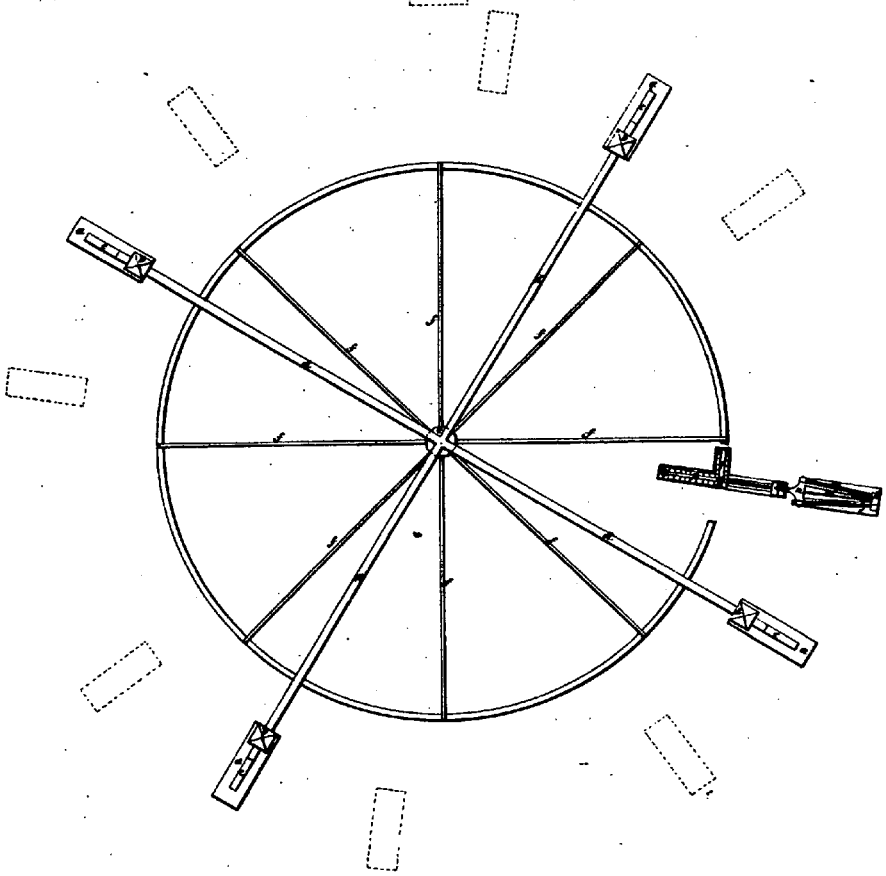
THE GRAPHIC CO. PHOTO-LITH. 39 & 41 PARK PLACE, N.Y.